United States Patent
Myers

(10) Patent No.: US 9,604,304 B2
(45) Date of Patent: Mar. 28, 2017

(54) METHODS AND SYSTEM FOR ENHANCED PLASMA TORCH CONTROL WITH AN INERTIAL SENSOR

(71) Applicant: LINCOLN GLOBAL, INC., City of Industry, CA (US)

(72) Inventor: Thomas R Myers, Summerville, SC (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 0 days.

(21) Appl. No.: 14/616,619

(22) Filed: Feb. 6, 2015

(65) Prior Publication Data

US 2015/0239059 A1    Aug. 27, 2015

Related U.S. Application Data

(60) Provisional application No. 61/943,133, filed on Feb. 21, 2014.

(51) Int. Cl.
| | |
|---|---|
| *B23K 10/00* | (2006.01) |
| *B23K 31/10* | (2006.01) |
| *B23K 37/02* | (2006.01) |
| *B23K 26/08* | (2014.01) |
| *B23K 26/38* | (2014.01) |
| *B26F 3/00* | (2006.01) |
| *B23K 26/70* | (2014.01) |
| *B26D 5/00* | (2006.01) |

(52) U.S. Cl.
CPC ........ *B23K 10/006* (2013.01); *B23K 26/0869* (2013.01); *B23K 26/0876* (2013.01); *B23K 26/38* (2013.01); *B23K 26/702* (2015.10); *B23K 31/10* (2013.01); *B23K 37/0235* (2013.01); *B23K 37/0258* (2013.01); *B26F 3/004* (2013.01); *B26D 5/00* (2013.01); *B26D 5/005* (2013.01)

(58) Field of Classification Search
CPC ...... B23K 10/00; B23K 10/006; B23K 31/10; B23K 37/0235; B23K 37/0258; B23K 26/0869; B23K 26/0876; B23K 26/38; B23K 26/702; B26F 3/004; H05H 1/36; H05H 1/26
USPC .......................... 219/121.39, 121.54, 121.67
See application file for complete search history.

(56) References Cited

U.S. PATENT DOCUMENTS

| | | | | |
|---|---|---|---|---|
| 6,359,251 | B1 * | 3/2002 | Picard ................... | B23K 10/00 219/121.39 |
| 7,071,441 | B1 * | 7/2006 | Bulle ..................... | B23K 10/00 219/121.39 |
| 8,274,013 | B2 * | 9/2012 | Wallace ............... | B23K 9/0953 219/124.34 |
| RE45,398 | E * | 3/2015 | Wallace .................... | 219/124.34 |
| 9,280,913 | B2 * | 3/2016 | Peters ...................... | G09B 5/00 |
| 2009/0298024 | A1 * | 12/2009 | Batzler .................... | B23K 9/32 434/234 |
| 2014/0144895 | A1 * | 5/2014 | Stork Genannt Wersborg ........... | B23K 26/046 219/121.75 |

* cited by examiner

*Primary Examiner* — Mark Paschall
(74) *Attorney, Agent, or Firm* — Perkins Coie LLP

(57) ABSTRACT

A cutting system that utilizes an inertial sensor to control movement of a cutting device is provided. The system includes a cutting device for cutting operation, a controller, and at least one inertial sensor. The controller controls movement of the cutting device during cutting operation. The inertial sensor(s) is included in an inertial data module coupled to the cutting device and communicates inertial measurement data to the controller. The controller controls movement of the cutting device based on the inertial measurement data from the inertial sensor(s).

20 Claims, 3 Drawing Sheets

METHODS AND SYSTEM FOR ENHANCED PLASMA TORCH CONTROL WITH AN INERTIAL SENSOR

PRIORITY

The present application claims priority to Provisional Application No. 61/943,133 filed on Feb. 21, 2014, which is incorporated herein by reference in its entirety.

FIELD OF THE INVENTION

Embodiments of the present invention relate generally to plasma arc cutting torch systems. More specifically, the embodiments relate to method and systems for controlling the movement and operation of plasma cutting systems.

BACKGROUND OF THE INVENTION

A number of automated plasma systems have been developed which use CNC technology to control the movement and process of a plasma cutting operation, including controlling the movement of the cutting torch etc. Known systems typically use encoders to provide movement feedback information to the system controller for movement and positional data. For example, in some applications the motors of movement mechanisms used in the systems provide feedback data to the system controller so that the system controller can track and control the movement of the various components during operation. The controller(s) also use this feedback data to determine the location of the cutting torch or other components during operation. However, sometimes this feedback information does not accurately represent the movement/position of the components (such as the torch) which can lead to the creation of inaccurate cuts and shapes.

Further limitations and disadvantages of conventional, traditional, and proposed approaches will become apparent to one of skill in the art, through comparison of such approaches with embodiments of the present invention as set forth in the remainder of the present application with reference to the drawings.

SUMMARY OF THE INVENTION

Exemplary embodiments of the present invention include methods and systems to cut holes, shapes and contours in work pieces using plasma cutting systems. The systems include a plasma arc torch, power supply, computer based controller, movement devices and a table. The system utilizes strategically placed accelerometers to provide additional feedback data to the system controller, where the system controller uses the accelerometer feedback data to monitor and/or control the movement and position of the system components.

Another embodiment of the present invention is a cutting system that includes at least one inertial sensor, e.g., accelerometer and gyro. The cutting system includes a cutting device, e.g., torch, water jet, and laser, to be used for cutting operation. The cutting system also includes a controller to control movement of the cutting device during cutting operation. At least one of the inertial sensor(s) is included in an inertial data module coupled to the cutting device, e.g., an inertial data module fixedly attached to a structure (e.g., mounting assembly) housing the cutting device. The inertial sensor communicates inertial measurement data to the controller. Based on the inertial measurement data, the controller controls movement of the cutting device.

Other aspects and advantages of the invention can become apparent from the following drawings and description, all of which illustrate the principles of the invention, by way of example only.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF THE INVENTION

Figure 1:
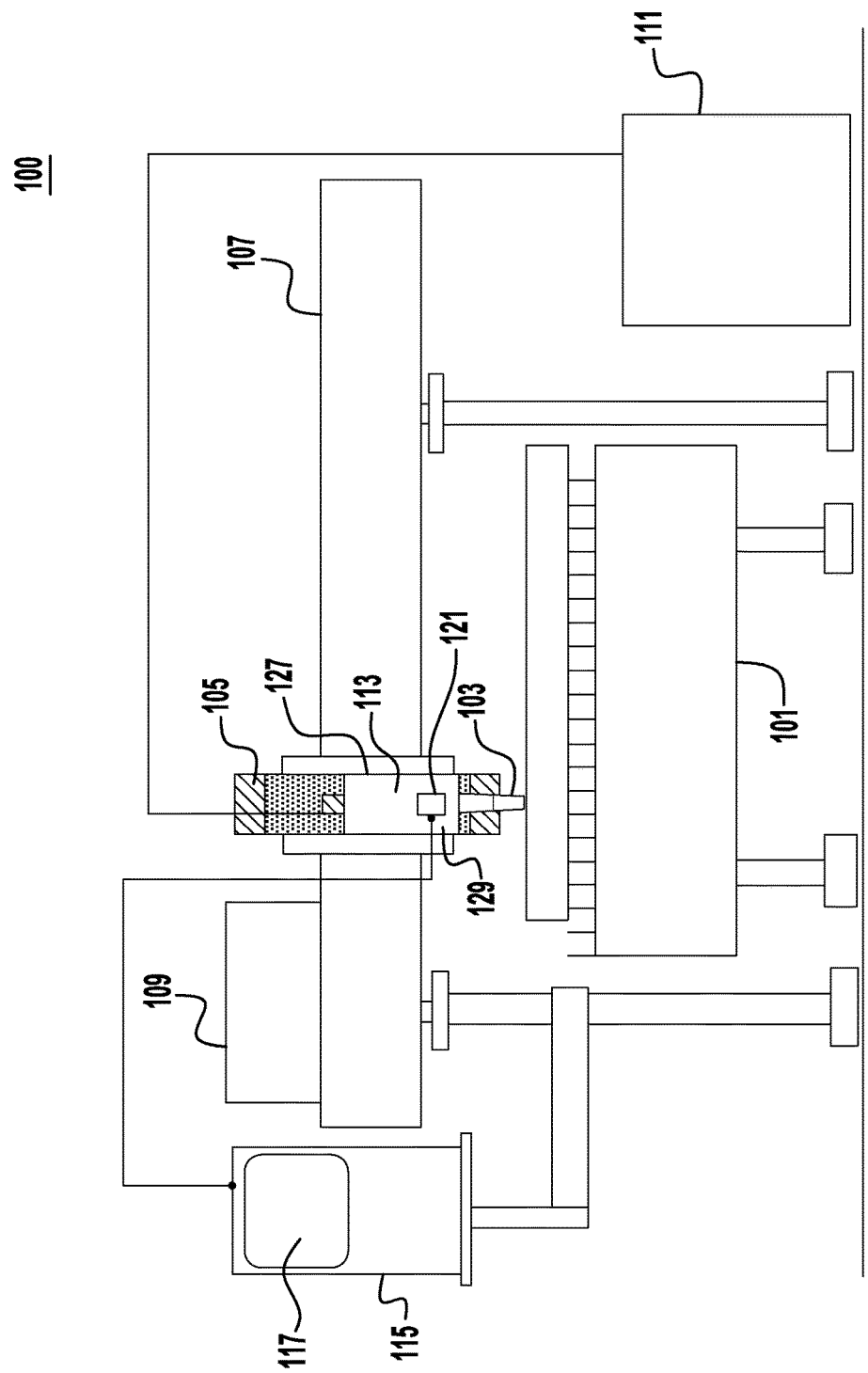
FIG. 1 is a diagrammatical representation of an exemplary embodiment of a plasma cutting system that can be used with embodiments of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

Embodiments of the present invention can be used for cutting holes, shapes and contours in workpieces of all material types. The exemplary embodiments discussed herein are directed to plasma cutting systems which are used to cut metal workpieces. However, it should be noted that embodiments of the present invention are not limited in this regard and can be used with other types of cutting systems, such as water jets, laser, etc. Therefore, while the following discussion references a plasma cutting system, it should be understood that this discussion is exemplary and embodiments of the present invention can be used with other types of cutting systems without departing from the spirit or scope of the present invention.

As briefly discussed above, defects can be encountered when cutting workpieces because the feedback information from the encoders (for position and movement) do not accurately reflect the actual position/movement of the torch. This can occur for any number of reasons, for example, slippage. Embodiments of the present invention address these issues through the use of accelerometers, which is discussed in more detail below.

FIG. 1 depicts an exemplary plasma cutting system 100. The plasma cutting system 100 includes a cutting table 101 and plasma torch 103. The construction and operation of cutting tables and plasma torches are well known by those of skill in the art and will not be discussed in detail herein. The system 100 can also use a torch height controller 105 which can be mounted to a gantry system 107. The system 100 can also include a drive system 109 which is used to provide motion to the torch 103 relative to a workpiece positioned in the table 101. A plasma cutting power supply 111 is coupled to the torch 103 to provide the desired current used to create the cutting plasma. The system 100 can also include a gas console 113 that can be used to regulate gas flow rates and pressures used for both the plasma and shield gas during the cutting operation. The console 113 can also be used to select different gases depending in the cutting operation that is being performed. That is, certain gases may be used for some cutting operations, but would not be used for others. The plasma cutting system 100 also includes a computer numeric controller (CNC) 115, which can include a user input/display screen (or user interface) 117. The user interface 117 and controller 115 are used by the user to input and read cutting operational parameters and data, and allow the system 100 to be used as an automated, programmable cutting system. Various input parameters can be input by a user into the controller 115, via the user interface 117 (or other means) including: torch current, material type, material thickness, cutting speed, torch height, plasma and shield gas composition, etc. As stated above, the plasma cutting system 100 can have many different configurations, and embodiments are not limited to that shown in FIG. 1, which is intended to be exemplary.

As is generally understood by those of ordinary skill in the art, the controller 115 can be any type of computer system that controls the plasma cutting system 100. As is general known, a controller has a processor, electronic storage device, and an interface for providing control instructions to the plasma cutting system 100. The storage or memory device can be internal or external and can contain data relating to the part to be cut in the workpiece. In other embodiments, the controller 115 can be manually programmed, and in some embodiments the controller 115 can include a computer readable product that includes computer readable instructions that can select or configure operating parameters of the plasma torch system. In further exemplary embodiments the computer readable instructions can be cut charts or nesting software. Such instructions typically include cutting information including instructions for the system 100 when cutting various holes or contours, taking into account the sizes and shapes of the holes/contours and the material being cut. As is generally understood the controller 115 can allow a user to cut numerous successive holes, contours or a combination of holes and contours in a workpiece without stopping between cuts. For example, the operator can select a cutting program that includes both hole and contour cutting instructions, and the controller 115 will determine the order and positioning of the cuts, as well as the various parameters of the cuts based on the user input information.

The user input/display screen 117 coupled to the controller 115 illustrates one possible hardware configuration to support the systems and methods described herein, which is being the controller for the system 100. Of course, similar controller type systems can be used to control and/or operate the systems described herein. In order to provide additional context for various aspects of the present invention, the following discussion is intended to provide a brief, general description of a suitable computing environment in which the various aspects of the present invention may be implemented. Those skilled in the art will recognize that the invention also may be implemented in combination with other program modules and/or as a combination of hardware and software. Generally, program modules include routines, programs, components, data structures, etc., that perform particular tasks or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based or programmable consumer electronics, and the like, each of which may be operatively coupled to one or more associated devices. The illustrated aspects of the invention may also be practiced in distributed computing environments where certain tasks are performed by remote processing devices that are linked through a communications network. In a distributed computing environment, program modules may be located in both local and remote memory storage devices.

The controller of the system (for example, the controller 115) can utilize an exemplary environment for implementing various aspects of the invention including a computer, wherein the computer includes a processing unit, a system memory and a system bus. The system bus couples system components including, but not limited to the system memory to the processing unit. The processing unit may be any of various commercially available processors. Dual microprocessors and other multi-processor architectures also can be employed as the processing unit.

The system bus can be any of several types of bus structure including a memory bus or memory controller, a peripheral bus and a local bus using any of a variety of commercially available bus architectures. The system memory can include read only memory (ROM) and random access memory (RAM). A basic input/output system (BIOS), containing the basic routines that help to transfer information between elements within the computer, such as during start-up, is stored in the ROM.

The controller (for example, the controller 115) can further include a hard disk drive, a magnetic disk drive, e.g., to read from or write to a removable disk, and an optical disk drive, e.g., for reading a CD-ROM disk or to read from or write to other optical media. The controller can include at least some form of computer readable media. Computer readable media can be any available media that can be accessed by the computer. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other magnetic storage devices, or any other medium which can be used to store the desired information and which can be accessed by a user interface coupled to the controller.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

A number of program modules may be stored in the drives and RAM, including an operating system, one or more application programs, other program modules, and program data. The operating system in the computer or the user interface can be any of a number of commercially available operating systems.

In addition, a user may enter commands and information into the computer through a keyboard and a pointing device, such as a mouse. Other input devices may include a microphone, an IR remote control, a track ball, a pen input device, a joystick, a game pad, a digitizing tablet, a satellite dish, a scanner, or the like. These and other input devices are often connected to the processing unit through a serial port interface that is coupled to the system bus, but may be connected by other interfaces, such as a parallel port, a game port, a universal serial bus ("USB"), an IR interface, and/or various wireless technologies. A monitor or other type of display device, may also be connected to the system bus via an interface, such as a video adapter. Visual output may also be accomplished through a remote display network protocol such as Remote Desktop Protocol, VNC, X-Window System, etc. In addition to visual output, a computer typically includes other peripheral output devices, such as speakers, printers, etc.

A display can be employed with a user interface coupled to the controller 115 to present data that is electronically received from the processing unit. For example, the display can be an LCD, plasma, CRT, etc. monitor that presents data electronically. Alternatively or in addition, the display can present received data in a hard copy format such as a printer, facsimile, plotter etc. The display can present data in any color and can receive data from a user interface via any wireless or hard wire protocol and/or standard.

The computer can operate in a networked environment using logical and/or physical connections to one or more remote computers, such as a remote computer(s). The remote computer(s) can be a workstation, a server computer, a router, a personal computer, microprocessor based entertainment appliance, a peer device or other common network node, and typically includes many or all of the elements described relative to the computer. The logical connections depicted include a local area network (LAN) and a wide area network (WAN). Such networking environments are commonplace in offices, enterprise-wide computer networks, intranets and the Internet.

When used in a LAN networking environment, the computer is connected to the local network through a network interface or adapter. When used in a WAN networking environment, the computer typically includes a modem, or is connected to a communications server on the LAN, or has other means for establishing communications over the WAN, such as the Internet. In a networked environment, program modules depicted relative to the computer, or portions thereof, may be stored in the remote memory storage device. It will be appreciated that network connections described herein are exemplary and other means of establishing a communications link between the computers may be used.

Also shown in FIG. 1, an inertial data module 121 is positioned on a torch assembly 127 of the plasma cutting system 100. In exemplary applications, the inertial data module 121 is a module which senses and provides inertial feedback data (or inertial measurement data) to the controller 115 so that the controller 115 can use this data to track and control the movement of the torch 103. In exemplary embodiments of the present invention, the inertial data module 121 contains a 3-axis, MEMS-type accelerometer and a 3-axis gyroscope (or inertial sensors), each of which are capable of outputting digital feedback data to the controller 115. In other exemplary embodiments, only one of an accelerometer and/or gyroscope is utilized. It should also be noted that in some exemplary embodiments, the gyroscope sensor is of a digital type. These types of gyros are beneficial when a bevel type cutting operation is performed—where the torch head tilts/rotates in two or more axes to provide angled cuts. In other embodiments, a gyro sensors can be mounted on a gear wheel (in the mechanical drive system) to generate instantaneous velocity readings and feedback—such that angular velocities can be converted to linear velocities.

The controller 115 receives the inertial feedback data from the inertial data module 121 and uses the information to control/monitor the movement of the torch 103 during operation of the system 100. In fact, in some exemplary embodiments of the present invention, the inertial data module 121 can be used as the only movement/positional feedback system and can replace the use of known encoder based feedback systems, e.g., an encoder disposed inside the motor of a movement mechanism of a cutting system and in communication with the CNC. In other exemplary embodiments of the present invention, the feedback data from the inertial data module 121 is used in conjunction with the positional/movement feedback data provided from encoder based systems. Because the use of encoder feedback data is known by those of skill in the art, the use and operation of such systems will not be described in detail.

By placing the inertial data module 121 near the torch 103, the inertial data module 121 will be able to accurately track the motion of the torch 103 in all three movement axes. Of course, in other exemplary embodiments, a single or 2-axis accelerometer and/or gyroscope can be used if only limited motion of the torch 103 is to be tracked.

The inertial data module 121 should be secured to a mounting assembly 129 for the torch 103 in the torch assembly 127, i.e., fixedly attached to a structure housing the torch 103, such that the inertial data module 121 can accurately track the movement of the torch 103. However, the inertial data module 121 should also be shielded such that the large current levels reached during a plasma cutting operation do not interfere with the operation of the inertial data module 121 and the data transmission to the controller 115.

In exemplary embodiments of the present invention, the controller 115 receives the inertial movement and/or positional data from the inertial data module 121 and uses this information in a similar way that current systems use encoder data. That is, the feedback is used for movement control and/or positional verification. However, in other exemplary embodiments, the feedback from the inertial data module 121 can be used in conjunction with known encoder feedback data. For example, the data from the inertial data module 121 can be used to verify the encoder data. In such embodiments, the controller 115 compares the feedback data from the inertial data module 121 with the encoder data in real-time to determine if there is any divergence (or difference) between the two data—which can indicate that the encoder data does not accurately reflect the movement/positioning of the torch 103. In some embodiments, if the difference between the encoder data and the feedback data from the inertial data module 121 exceeds a predetermined threshold then the controller 115 can provide an error signal to a user and/or stop the cutting operation. In fact, this comparison can be used in a number of different ways in different exemplary embodiments, which will be generally described in the examples below.

In one exemplary embodiment, the controller 115 contains a look-up table, state-table, algorithm, etc. which determines a maximum amount of divergence between the encoder data and the inertial data module 121 data, depending on the shape and/or type of the cut to be performed, the thickness of the material being cut, the speed of the cut, and/or a user input related to the desired tolerance of the cut. With respect to the shape or type of the cut, the controller 115 can take into account the overall size, perimeter and/or shape of the cut. Based on at least some of this information the controller 115 determines a maximum acceptable data divergence level between the encoder data and the feedback data from the inertial data module 121 that can be tolerated during the cutting operation. In some exemplary embodiments, this data divergence level can be measured by a deflection distance amount—for example in mm, cm, in., etc. During the cutting operation if the inertial data module 121 shows a movement or position that exceeds the set data divergence level then a warning or error message can be provided to the user via the controller 115 and user interface. In other exemplary embodiments, when the data divergence level is exceeded, the controller 115 can cause the cutting operation to be stopped so that the cutting operation does not continue to produce a defective component.

In some exemplary embodiments, the controller 115 can set at least two data divergence levels prior to the cutting operation (which, of course, can be different for different parts and cutting operations). In such embodiments, the first divergence level can be an error level. That is, if this level is exceeded, the cutting operation continues but notes that an error or a divergence has occurred to the user. Again, this can be done by displaying an error message on the user interface 117 or via other known methodology. The second data divergence level is larger than the first data divergence level and if this level is exceeded then the cutting operation is shut off. Thus, such embodiments will not stop the cutting operation when there are minor deviations, but will prevent the creation of undesired product if the divergence between the two data is too great—which can signify significant problems with the cutting operation. Thus, for example, if during a cutting operation a divergence between the encoder and inertial data module 121 data is above a first threshold then an error message will be displayed, and if the divergence exceeds a second threshold, the controller 115 causes the cutting operation to stop.

In other exemplary embodiments, the controller 115 can also monitor and record the time (or duration of time) of divergence in the positional/movement data between the encoder and the inertial data module 121. That is, in addition to monitoring the actual differences between the movement data, the controller 115 can also monitor and record the amount of time that the positional data was inconsistent with each other. This can allow for the determination of whether or not the positional differences are significant or not.

In other exemplary embodiments, the controller 115 does not make continuous real time comparisons between the encoder data and the data from the inertial data module 121, but makes the comparisons at a sample rate (or at discrete time intervals). The sample rate can be set by the controller 115 based on the same type of information discussed above regarding the setting of the data deflection threshold. For example, for more precise cuts the sample rate can be higher than that for less precise cuts. In some embodiments, the sample rate can be preset in the controller 115. During operation, the controller 115 compares the encoder data and the data from the inertial data module 121 at the set sample rate, and can function as described in any of the above exemplary embodiments. In other embodiments, the controller 115 can switch from the sample rate detection to real time comparison after a deflection higher than the deflection threshold is detected by the controller 115. For example, in such embodiments the controller 115 is comparing the encoder data and the data from the inertial data module 121 at a set sample rate, and once a divergence between the two data is detected, the controller 115 either changes to a faster sample rate or to real-time comparison between the two data to more accurately track the divergence between the two data. In such embodiments, the controller 115 is not overly tasked in comparing data until an unacceptable amount of deflection or anomaly is detected. In exemplary embodiments, the controller 115 can display an error message and/or stop the cutting operation after a single divergence in the data is detected, while in other embodiments, the controller 115 will only display an error a message and/or stop the operation if a certain number n of sequential divergence detections are made. Such embodiments, prevent the displaying of an error message for only minor divergent events. It is noted that in some exemplary embodiments, the inertial sensors are of the type that provide a digital output at a high sample rate to provide the needed motion data. These sensors are typically of a type that are more noise resistant than analog type sensors. However, in some embodiments, analog type sensors can be used, and in even other embodiments a combination of analog and digital sensors can be used.

For example, during a cutting operation the controller 115 is constantly comparing the encoder data and the data from the inertial data module 121 for any divergence between the two data (this can be done continuously or via a set sampling rate). If a divergence is detected, the controller 115 starts a counter and/or timer and if the data between the encoder and inertial data module 121 is divergent for longer than a number n of consecutive samples and/or for longer than a set duration of time t, then the controller 115 signals an error message and/or stops the cutting operation. Of course, in some exemplary embodiments, this would only occur if the divergence is over a certain threshold as described previously.

Figure 3:
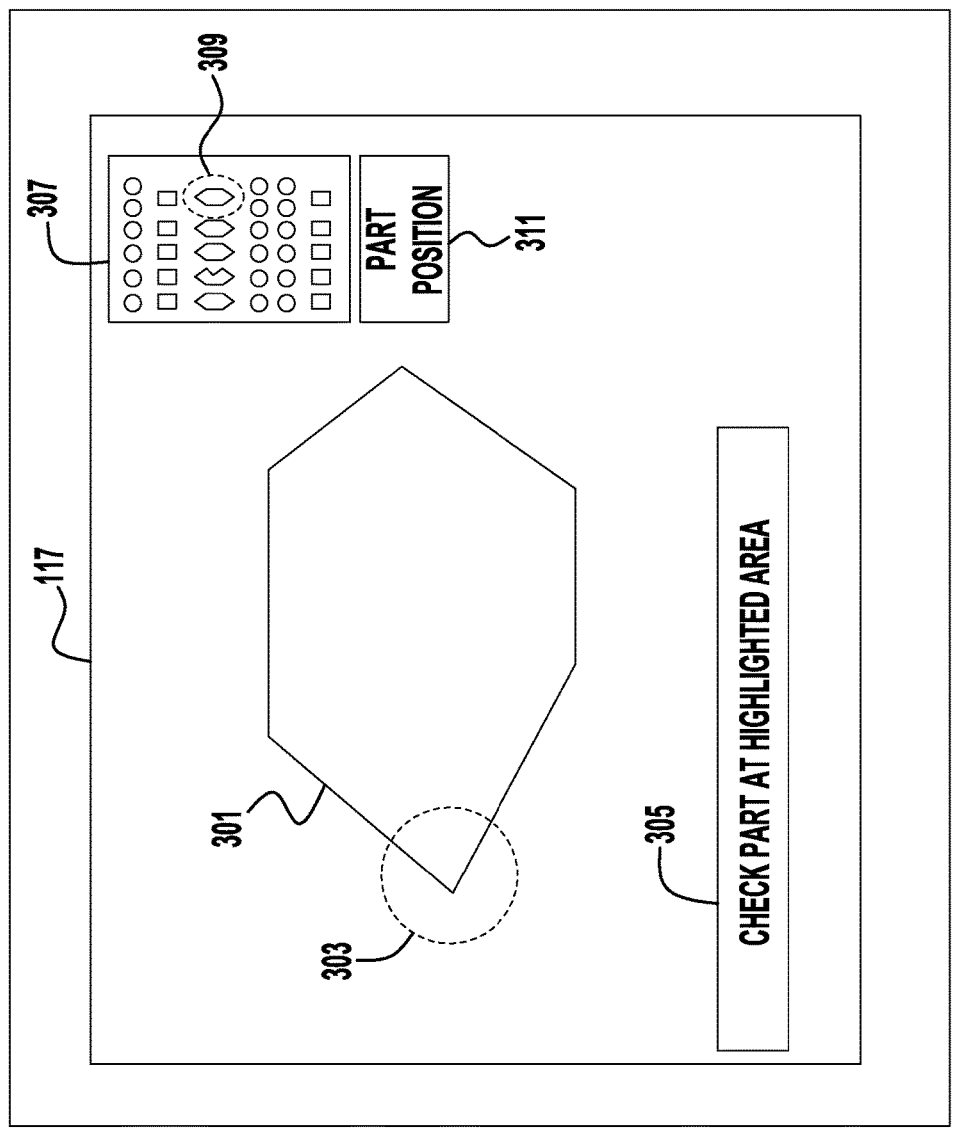
FIG. 3 is a diagrammatical representation of a user interface display in accordance with an exemplary embodiment of the present invention.

FIG. 3 depicts an exemplary image that can be displayed on the user interface 117 by the controller 115 if an error is detected. As shown the display in the user interface 117 can show an image of the part being cut 301 and highlight the area 303 on the part at which the divergence in the data between the encoder and inertial data module 121 occurred. An error message 305 can also be displayed. This allows the user to know where to look at the finished product for a possible cut that is out of the desired tolerances. Further, exemplary embodiments can display the entire workpiece sheet 307 with all of the parts 309 cut out of the sheet 307 (with a message 311) to allow the user to identify which part on the sheet 307 should be examined. This is particularly useful if multiple cuts of the same shape and size are made on the sheet 307. In such embodiments, the controller 115 visually indicates to the user which part and/or which area of the part should be examined for a possible defect. This can greatly accelerate the manufacturing process.

Figure 2:
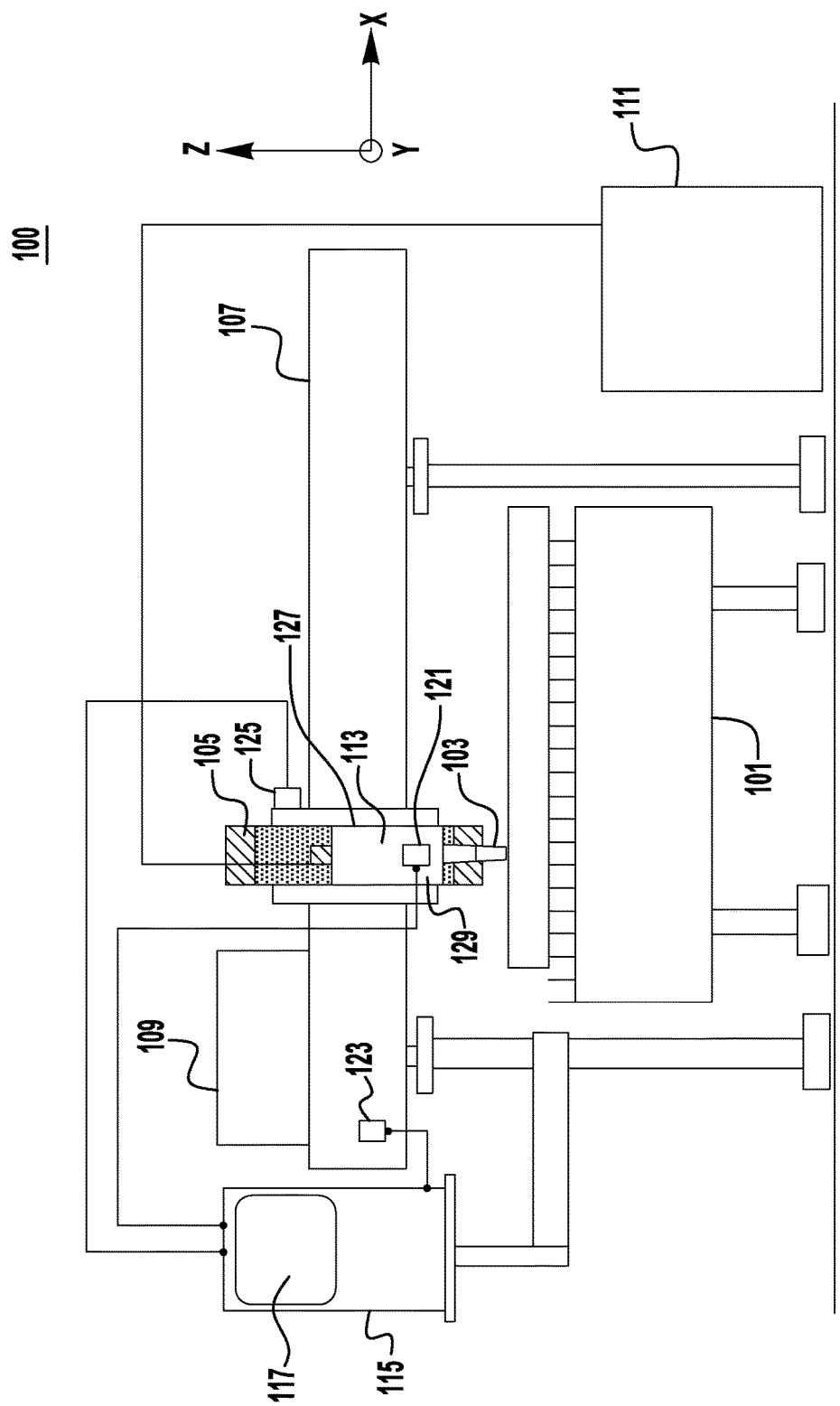
FIG. 2 is a diagrammatical representation of another exemplary embodiment of a plasma cutting system that can be used with embodiments of the present invention.

FIG. 2 depicts another exemplary embodiment of the present invention, where more than one inertial data modules 121, 123, 125 are used. In such embodiments, the inertial data modules can be mounted on all, or some of the motion components of the system 100. For example, in addition to being mounted on the torch 103 (or the mounting assembly 129), they can be mounted in or fixedly attached to the gantry 107 (i.e., the inertial data module 123) and on the motion control device which moves the torch 103 along the gantry 107 (i.e., the inertial data module 125). The inertial data modules 121, 123, 125 can be of the type described above—that is using 3-axis accelerometers and/or gyroscopes. But they can also utilize 2-axis, or 1-axis accelerometers and/or gyroscopes. In some of such embodiments, some or all of the inertial data modules 121, 123, 125 can monitor the motion along only a single axis. For example, the torch module 121 can measure motion along the Z-axis, while the gantry module 123 measures along the y-axis and the torch movement module 125 measures along the x-axis. In other exemplary embodiments, some or all of the inertial data modules 121, 123, 125 can have different levels of sensitivity. That is, the torch module 121 can use 3-axis components while the others utilize only 2 or 1-axis components.

By utilizing inertial data module(s), embodiments of the present can be used to replace or enhance the known encoder based motion/position feedback systems to ensure highly accurate cutting operations. Further, in some exemplary embodiments, the feedback positional data from the accelerometers and/or gyros will need to be used by the controller 115 (for example, to control the system operation) within a limited time window. This is because, in some embodiments or implementations, the numerical integrations and/or algorithms used by the controller 115 may accumulate error and drift over a period of time. Therefore, in some embodiments, the inertial sensor feedback data will be used by the controller 115 in a period of time n.

It is noted that in some exemplary embodiments, the controller 115 records (into a memory or other data storage device) the stream of accelerometer inputs and gyro data, in addition to the encoder data—if used—during a cutting operation. This recorded data can be used to compare the data to other cutting operations of the same or similar parts, or for detecting errors or issues during a cut, and for general quality control purposes.

In further exemplary embodiments, the positional sensors (gyros and/or accelerometers) can be used with some encoder data to perform a pre-operation tuning of the cutting system. For example, the sensors can be used by the controller 115 to tune the motion parameters of the table and system when setting up a controller 115 with a table. For example, the controller 115 can employ an algorithm to use the sensor data (perhaps in conjunction with encoder data) during a system tuning process (e.g., PID loop parameters) and assist an operator in setting up the system for cutting.

It should also be noted that in some embodiments, due to inherent noise in the data provided by accelerometers and gyro type sensors, their data should be digitally filtered to exclude gear vibrations or arc cutting vibrations while the torch is in motion and/or cutting.

As explained previously, the above-described techniques can be implemented in the controller 115, or any other computer controlled system, using digital electronic circuitry, or in computer hardware, firmware, software, or in combinations of them. The implementation can be as a computer program product, i.e., a computer program tangibly embodied in an information carrier (e.g., a CPS). An information carrier can be a machine-readable storage device or in a propagated signal, for execution by, or to control the operation of, data processing apparatus (e.g., a programmable processor, a computer, or multiple computers).

A computer program (e.g., a computer program system) can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, (e.g., magnetic, magneto-optical disks, or optical disks). Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a CNC or computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

Comprise, include, and/or plural forms of each are open ended and include the listed parts and can include additional parts that are not listed. And/or is open ended and includes one or more of the listed parts and combinations of the listed parts.

While the invention has been particularly shown and described with reference to specific illustrative embodiments, it should be understood that various changes in form and detail may be made without departing from the spirit and scope of the invention.

The invention claimed is:

1. A plasma torch cutting system, comprising:
a plasma torch to be used for cutting operation;
a computer numeric controller to control at least one of position and movement of the plasma torch during the cutting operation; and
at least one inertial sensor included in an inertial data module coupled to the plasma torch, the at least one inertial sensor to communicate inertial measurement data to the controller,
wherein the controller at least one of monitors and controls the at least one of position and movement of the plasma torch based on the inertial measurement data from the at least one inertial sensor.

2. The system of claim 1, wherein the at least one inertial sensor includes at least one of an accelerometer and a gyro.

3. The system of claim 1, wherein the system further comprises an encoder to provide feedback data to the controller with regard to the at least one of position and movement of the plasma torch.

4. The system of claim 3, wherein the controller controls movement of the plasma torch based on the feedback data from the encoder as well as the inertial measurement data from the at least one inertial sensor.

5. The system of claim 3, wherein the controller compares the inertial measurement data to the feedback data.

6. The system of claim 5, wherein when a difference between the inertial measurement data and the feedback data is greater than a predetermined threshold value, the controller generates an error message.

7. The system of claim 5, wherein the controller has a first predetermined threshold value and a second predetermined threshold value greater than the first predetermined threshold value, and wherein the first and second predetermined threshold values are used to evaluate the comparison between the inertial measurement data and the feedback data.

8. The system of claim 7, wherein when a difference between the inertial measurement data and the feedback data is less than or equal to the first predetermined threshold value, the controller causes the cutting operation to continue.

9. The system of claim 7, wherein when a difference between the inertial measurement data and the feedback data is greater than the first predetermined threshold value, and is less than or equal to the second predetermined threshold value, the controller generates an error message.

10. The system of claim 7, wherein when a difference between the inertial measurement data and the feedback data is greater than the second predetermined threshold value, the controller generates an error message and causes the cutting operation to be stopped.

11. The system of claim 6, wherein the predetermined threshold value is determined based on at least one of a shape of cutting, a type of cutting, a thickness of material being cut, a speed of cutting, and a user input regarding desired tolerance of cutting.

12. The system of claim 5, wherein the comparison is made at discrete time intervals set by the controller based on at least one of a shape of cutting, a type of cutting, a thickness of material being cut, a speed of cutting, and a user input regarding desired tolerance of cutting.

13. The system of claim 12, wherein the controller includes a counter that increments a count value each time there is a difference at the discrete intervals between the inertial measurement data and the feedback data that is greater than a predetermined threshold value, and when the count value is greater than a second predetermined threshold value, the controller generates an error message.

14. The system of claim 6, wherein the system further comprises a user interface including a display that displays the error message generated by the controller.

15. The system of claim 1, wherein the system further comprises a gantry that moves the plasma torch during the cutting operation and at least one secondary inertial sensor included in a secondary inertial data module coupled to the gantry, the at least one secondary inertial sensor to communicate inertial measurement data to the controller, and wherein the controller controls movement of the plasma torch based on the inertial measurement data from the at least one inertial sensor and the at least one secondary inertial sensor.

16. The system of claim 1, wherein the at least one inertial sensor is a multi-axis sensor.

17. The system of claim 3, wherein a pre-operation tuning is performed based on data from the encoder and the at least one inertial sensor.

18. A cutting system, comprising:
a cutting device to be used for cutting operation;
a computer numeric controller to control at least one of position and movement of the cutting device during the cutting operation; and
at least one inertial sensor included in an inertial data module coupled to the cutting device, the at least one inertial sensor to communicate inertial measurement data to the controller,
wherein the controller at least one of monitors and controls the at least one of position and movement of the cutting device based on the inertial measurement data from the at least one inertial sensor.

19. The system of claim 18, wherein the cutting device is a water jet or a laser.

20. A method for controlling movement of a cutting device in a cutting system during cutting operation, comprising:
receiving, during the cutting operation, inertial measurement data from at least one inertial sensor included in an inertial data module coupled to the cutting device; and
providing the received inertial measurement data to a computer numeric controller which at least one of monitors and controls at least one of a position and movement of the cutting device based on the received inertial measurement data.

* * * * *